(12) United States Patent
Ishikawa et al.

(10) Patent No.: US 8,083,048 B2
(45) Date of Patent: Dec. 27, 2011

(54) CONVEYER APPARATUS

(75) Inventors: Yoshinobu Ishikawa, Tokyo (JP); Tadashi Munakata, Tokyo (JP); Yoshio Ogimura, Tokyo (JP); Nobuhiko Teshima, Tokyo (JP); Shigeo Nakagaki, Tokyo (JP); Hitoshi Kawamoto, Tokyo (JP); Kenichi Fujii, Tokyo (JP); Yoshifumi Ikeda, Tokyo (JP); Kazuhisa Hara, Tokyo (JP); Takayuki Kikuchi, Tokyo (JP)

(73) Assignee: Toshiba Elevator Kabushiki Kaisha, Tokyo (JP)

( * ) Notice: Subject to any disclaimer, the term of this patent is extended or adjusted under 35 U.S.C. 154(b) by 746 days.

(21) Appl. No.: 11/607,119

(22) Filed: Dec. 1, 2006

(65) Prior Publication Data

US 2007/0235284 A1 Oct. 11, 2007

Related U.S. Application Data

(63) Continuation of application No. 11/402,256, filed on Apr. 12, 2006, now abandoned, which is a continuation of application No. 10/536,252, filed as application No. PCT/JP03/14907 on Nov. 21, 2003, now abandoned.

(30) Foreign Application Priority Data

Nov. 25, 2002 (JP) ................................. 2002-341393
May 16, 2003 (JP) ................................. 2003-139075

(51) Int. Cl.
*B66B 21/00* (2006.01)
*B66B 21/02* (2006.01)
(52) U.S. Cl. ........................................ 198/326; 198/330

(58) Field of Classification Search .................. 198/326, 198/327, 328, 329, 330, 331, 332, 333, 334, 198/338
See application file for complete search history.

(56) References Cited

U.S. PATENT DOCUMENTS

| | | | | | |
|---|---|---|---|---|---|
| 1,455,542 | A | * | 5/1923 | Margles et al. | 198/332 |
| 2,103,327 | A | * | 12/1937 | Handy | 198/332 |
| 2,260,591 | A | * | 10/1941 | Thurston et al. | 198/332 |
| 3,365,051 | A | * | 1/1968 | Mullis et al. | 198/833 |
| 3,834,513 | A | | 9/1974 | Miura et al. | |
| 4,444,302 | A | * | 4/1984 | Dunstan | 198/334 |
| 4,498,890 | A | | 2/1985 | Sutherland | |
| 4,519,490 | A | * | 5/1985 | White | 198/333 |
| 4,576,276 | A | * | 3/1986 | Boltrek et al. | 198/332 |
| 4,884,673 | A | * | 12/1989 | Rivera | 198/328 |
| 4,930,622 | A | * | 6/1990 | Sansevero | 198/328 |
| 5,020,654 | A | * | 6/1991 | Sansevero et al. | 198/328 |
| 5,134,571 | A | * | 7/1992 | Falque et al. | 700/228 |
| 5,306,212 | A | | 4/1994 | Eberle | |

(Continued)

FOREIGN PATENT DOCUMENTS

EP 0 554 551 A1 8/1993
(Continued)

*Primary Examiner* — Ramya Prakasam
(74) *Attorney, Agent, or Firm* — Foley & Lardner LLP (57) ABSTRACT

A footstep guide rail (3) (rail body 3*a*) is arranged so that a level H of a horizontal surface is set at the position obtained by adding a designated offset δ to a tangential line L of a drive sprocket (9) and the footstep guide rail (3) is provided, at its one end on an introductory side of the drive sprocket (9), with a curved part (13). At a reference position closest to the drive sprocket (9), the horizontal surface of the footstep guide rail (3) is changed to the curved part (13). Consequently, it is possible to absorb velocity unevenness of one footstep roller approaching the drive sprocket (9).

13 Claims, 9 Drawing Sheets

U.S. PATENT DOCUMENTS

| | | | |
|---|---|---|---|
| 5,697,486 A | 12/1997 | Krampl | |
| 5,829,570 A * | 11/1998 | Kwon | 198/326 |
| 6,016,902 A | 1/2000 | Kwon | |
| 6,092,639 A * | 7/2000 | Reo | 198/329 |
| 6,098,779 A * | 8/2000 | Kubota | 198/333 |
| 6,382,388 B1 * | 5/2002 | Hirai et al. | 198/332 |
| 6,655,521 B2 * | 12/2003 | Ulrich et al. | 198/326 |
| 6,685,003 B2 * | 2/2004 | Copeland et al. | 198/326 |
| 6,974,018 B2 * | 12/2005 | Lunardi et al. | 198/331 |
| 7,159,705 B2 * | 1/2007 | Ogimura et al. | 198/326 |
| 7,868,780 B2 * | 1/2011 | Engel et al. | 340/870.07 |

FOREIGN PATENT DOCUMENTS

| | | |
|---|---|---|
| FR | 1437778 | 5/1966 |
| GB | 422184 | 1/1935 |
| JP | 51-038993 | 10/1976 |
| JP | 6-24535 A | 2/1994 |
| JP | 08-217368 A | 8/1996 |
| JP | 2828970 B2 | 11/1998 |
| WO | WO 00/07924 | 2/2000 |

* cited by examiner

CONVEYER APPARATUS

The present application is a continuation of U.S. application Ser. No. 11/402,256, filed Apr. 12, 2006, which is a continuation of U.S. application Ser. No. 10/536,252, filed May 25, 2005, the entire contents of which are incorporated herein by reference.

TECHNICAL FIELD

The present invention relates to a conveyer apparatus, such as an escalator and a moving walkway.

BACKGROUND ART

A conveyer apparatus, such as an escalator and a moving walkway, includes a plurality of footsteps provided with footstep rollers. Since these plural footsteps are linked to each other at predetermined pitches through an endless footstep chain, the footsteps are integrated with the footstep chain. Since the footstep chain is driven by a chain drive mechanism, all the foot steps can move synchronously without leaving any space between the footsteps. Additionally, with the engagement of the plural footstep rollers with a footstep guide rail disposed in a structure, these footsteps move between an entrance and an exit circulatively while being supported by the footstep guide rail. Note, it is generally the case that a plurality of footsteps move horizontally in the moving walkway. In this view, there is a case that the footsteps are called "footplates". In this specification, however, the notation will be unified to "footsteps", including the footplates in a moving walkway.

In the field of chain drive mechanism for driving a footstep chain, there is a mechanism in which a drive motor is transmitted to a footstep chain through a drive sprocket in an arrangement where a turn-over end of the footstep chain is wound around the drive sprocket rotated by driving force of the drive motor. Normally, such a chain drive mechanism is arranged in a structure called a "truss", which is in the vicinity of entrance or exit of a conveyer apparatus.

Hitherto, it requires sufficient space to install a truss in which a chain drive mechanism. Due to progress in the installation technology etc., nowadays, the truss can be miniaturized in size. In this view, there is an attempt to minimize the size of the whole conveyer apparatus, saving an installation space of the apparatus. In the case of a small-sized truss as above, a small-diameter sprocket would be required as the drive sprocket of a chain drive mechanism. However, if such a small-diameter sprocket is employed as the drive sprocket of the chain drive mechanism, then a problem arises in that great unevenness is produced in the velocity of the footstep rollers linked by the footstep chain, being actualized in the form of vibrations of the footsteps and further deteriorating the ride quality of the conveyer apparatus.

In the technology to accomplish a smooth movement of footsteps with restriction of velocity unevenness about the footstep rollers, a technique is proposed (Japanese Patent Application Laid-open (Heisei) No. 8-217368). In the disclosed technique, for instance, the level of a horizontal surface (travelling track) of a footstep guide rail is established higher than the tangential line of a drive sprocket by an interval ho. In connection, the drive sprocket is provided, at its introductory end, with a compensating rail having a curved track. In operation, the footstep rollers are respectively engaged with the drive sprocket while being guided by the curved track of the compensating rail.

In order to accomplish a smooth movement of the footsteps with restriction of velocity unevenness of the footstep rollers, according to the art described in the Patent Document, it is performed, on a basis of a geometric model, to apply an instantaneous angle $\phi$ of a link pin (footstep roller) meshing with the drive sprocket and instantaneous angles $\epsilon 1$, $\epsilon 2$ of a link of the footstep chain to a tangential line of the drive sprocket to definitional equations, obtaining an optimal value for the above interval ho and an optimal curve of the compensating rail.

According to the art described in the above Patent Document, it is possible to suppress the velocity unevenness of the footstep rollers effectively. However, since a level of the horizontal surface of the footstep guide rail is relatively higher than the drive sprocket, the same art has a disadvantage in obtaining a minimized size of the whole conveyer apparatus. Thus, it is noted that as an interval ho between the tangential line of the drive sprocket and a horizontal surface of the footstep guide rail is proportional to a link length of the footstep chain. Therefore, if a small-diameter sprocket is used for the drive sprocket especially, the link length of the footstep chain against the drive sprocket becomes larger relatively, so that the interval ho between the tangential line of the drive sprocket and the horizontal surface of the footstep guide rail grows larger. Such an increase in the interval ho causes the truss to be large-sized, producing an obstacle in obtaining a minimized size of the whole conveyer apparatus.

Additionally, when considering a situation where the conveyer apparatus is driven while reversing outward and homeward routes, the return side of the footstep-guide rail has to be arranged below the drive sprocket by a similar interval ho, thereby requiring a considerable height of the apparatus for such upper and lower intervals (2×ho).

If the drive sprocket is formed with 348.4 mm in the pitch-circle diameter and eight teeth and the link length of the footstep chain is 133.33 mm, the interval ho between the tangential line of the drive sprocket and the horizontal surface of the footstep guide rail has to be more than 35.3 mm in order to completely eliminate the velocity unevenness of the footstep roller in the above-mentioned prior art, according to the inventors' trial calculation. Further totalizing both of the outward side and the return side of the apparatus, it is necessary for the apparatus to make sure of an extra height of 70.6 mm (2×ho) in addition to the size of the drive sprocket.

Therefore, it results in spoiling the space-saving effect that is brought by reducing the pitch-circle diameter of the drive sprocket down as far as 348.4 mm.

DISCLOSURE OF THE INVENTION

The present invention is invented in consideration of the conventional situation mentioned above and therefore, it is an object of the present invention to provide a conveyer apparatus which effectively suppresses the velocity unevenness of footstep rollers in order to assure the comfortable ride quality and which allows a thickness of the apparatus to be reduced as a whole.

The conveyer apparatus of the present invention comprises: a footstep guide rail; a plurality of footsteps having footstep rollers moving along the footstep guide rail; a footstep chain for connecting the footstep rollers of the plurality of footsteps with each other at predetermined pitches; a rotating device for generating a driving force to move the footsteps in a designated direction; and a drive sprocket rotating on receipt of the driving force of the rotating device and transmitting the driving force of the rotating device to the footstep chain, wherein the footstep guide rail is arranged so that a horizontal surface thereof is set at a level on a position obtained by adding a designated offset to a tangential line of the drive sprocket along the horizontal surface, and the footstep guide rail is provided, at its one end on an introductory side of the drive sprocket, with a curved part, and providing that "Vt" represents a pitch-circle velocity of the drive sprocket, "Vo" a target average velocity of one of the footstep rollers connected and moved by the footstep chain and "reference position" represents a position where a velocity of the footstep roller becomes "Vo" as a result of its decelerating from "Vt", wherein one of a plurality of "reference positions" existing along the footstep guide rail, which is the closest to the drive sprocket, is established as a turning point from the horizontal surface of the footstep guide rail to the curved part.

In this conveyer apparatus, when the rotating device is driven, the drive sprocket rotates on receipt of a driving force of the rotating device, so that the driving force of the rotating device is transmitted to the footstep chain due to the rotation of the drive sprocket. The drive of the footstep chain allows respective footsteps rollers of the plural footsteps connected with each other through the footstep chain to move along the footstep guide rail in circulation. Then, the footstep rollers move on the horizontal surface of the footstep guide rail, which is set at a level on a position obtained by addition the designated offset to the tangential line of the drive sprocket and subsequently move from the reference position closest to the drive sprocket along the curved part, into the meshing condition with the drive sprocket. As a result, velocity unevenness of a preceding footstep roller is absorbed and the velocity unevenness is not transmitted to a following footstep roller, thereby keeping the moving velocity of the footstep rollers at a substantial average velocity. Thus, with restriction of vibration caused by the velocity unevenness of the footstep rollers, it is possible to make sure of comfortable ride quality about the conveyer apparatus. Additionally, with no need of establishing such a great value for the offset, it is advantageous in realizing the thin formation of the apparatus. Moreover, if establishing an optimal value for the offset, then it is possible to provide the curved part of the footstep guide rail with the profile of a falling contour that gently falls from the horizontal surface to the meshing position of the drive sprocket. Such a profile does not cause the footstep rollers to float and therefore, there is no need to provide a pusher member for preventing the floating of the footstep rollers.

Without applying only to the introductory side of the drive sprocket, the curved part is also applicable to a footstep guide rail having a straight part and an arc part, in detail, a changing portion from the straight part to the arc part. That is, provided that the straight part of the footstep guide rail is established at a level position obtained by adding a designated offset and that the footstep guide rail is provided, at a changing portion from the straight part to the arc part, with a curved part as mentioned above so that the footstep rollers moving along the straight part of the footstep guide rail can reach the arc part through the curved part and subsequently move along the arc part, it is possible to absorb the velocity unevenness of the footstep guide rail effectively, restraining vibration of the footsteps and also possible to ensure comfortable of ride quality about the apparatus.

Based on the above-mentioned knowledge, another conveyer apparatus of the present invention comprises: a footstep guide rail having a straight part and an arc part; a plurality of footsteps having footstep rollers moving along the footstep guide rail; a footstep chain for connecting the footstep rollers of the plurality of footsteps with each other at predetermined pitches; and a rotating device for generating a driving force to move the footsteps in a designated direction, wherein the footstep guide rail is arranged, at a changing portion thereof from the straight part to the arc part, so that a horizontal surface by regarding the straight part as horizontal is set at a level on a position obtained by adding a designated offset to a tangential line of the arc part along the horizontal surface, and the footstep guide rail is provided, at the changing portion for the arc part, with a curved part.

Instead of establishing the straight part of the footstep guide rail at a level as a result of adding a designated offset, alternatively, if subtracting a designated offset from a radius curvature of the arc part of the footstep guide rail and additionally providing a similar curved part in a changing portion from the straight part to the arc part of the footstep guide rail, it is possible to absorb the velocity unevenness of the footstep guide rail effectively, restraining vibration of the footsteps and also possible to ensure comfortable of ride quality about the apparatus.

Based on the above-mentioned knowledge, a still further conveyer apparatus of the present invention comprises: a footstep guide rail having a straight part and an arc part; a plurality of footsteps having footstep rollers moving along the footstep guide rail; a footstep chain for connecting the footstep rollers of the plurality of footsteps with each other at predetermined pitches; and a rotating device for generating a driving force to move the footsteps in a designated direction, wherein at a changing portion of the footstep guide rail from the straight part to the arc part, a curvature radius of the arc part is determined by subtracting a designated offset from a horizontal surface obtained by regarding the straight part as horizontal, and the footstep guide rail is provided, at the changing portion for the arc part, with a curved part.

BEST MODE FOR CARRYING OUT THE INVENTION

Embodiments of the present invention will be described below, with reference to accompanying drawings.

Figure 1:
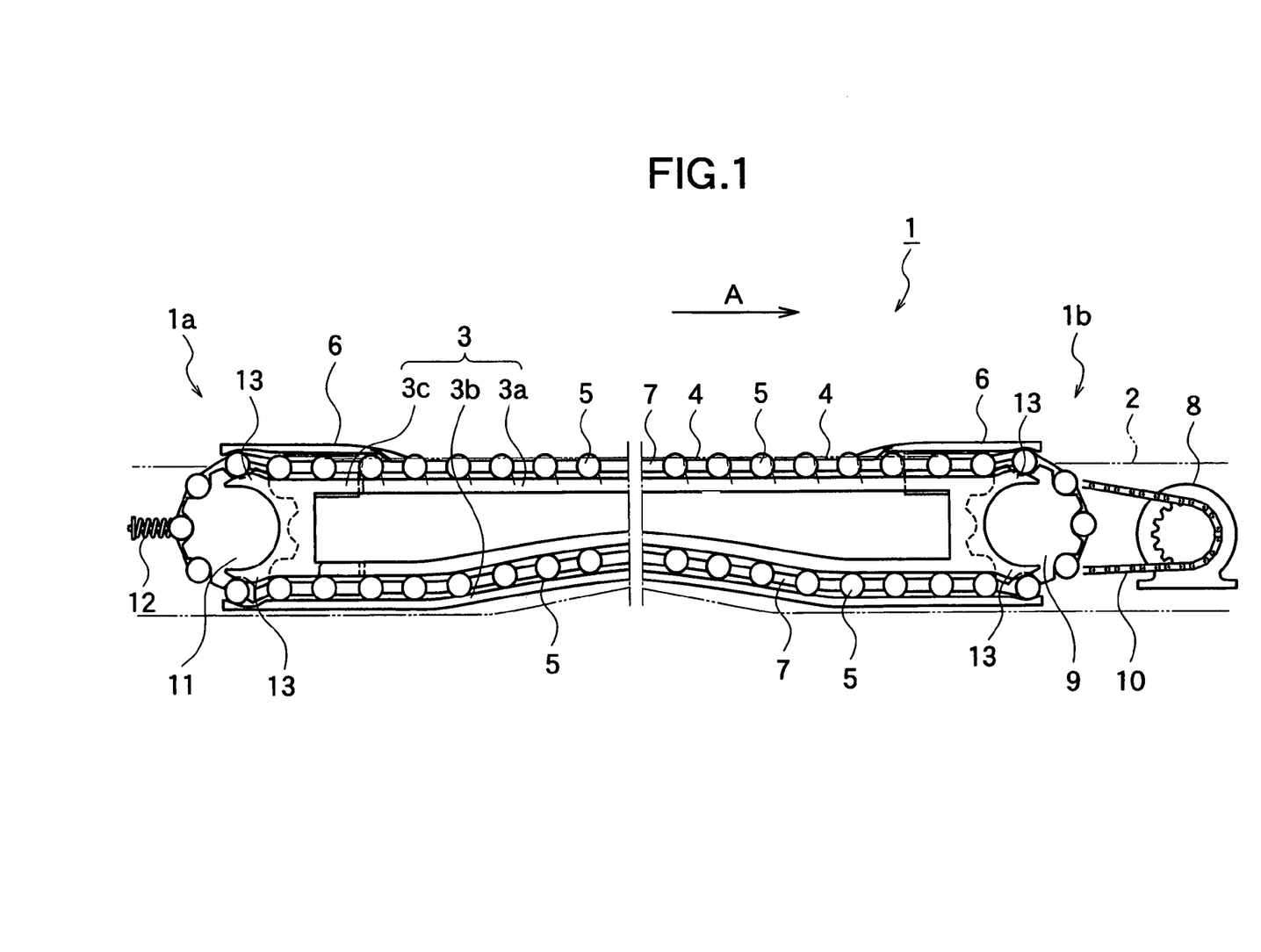
FIG. 1 is a whole structural view showing one example of a conveyer apparatus on application of the present invention.

FIG. 1 shows the whole constitution of a conveyer apparatus of the present invention schematically. The shown conveyer apparatus 1 of FIG. 1 is constructed as a moving walkway that is arranged substantially horizontally to a road surface to convey passengers. The conveyer apparatus 1 includes a structure 2 called "truss" for supporting its own weight and loads of the passengers. This structure 2 is accommodated in a pit that is disposed below the road surface.

In the structure 2, a footstep guide rail 3 is arranged so as to go around from an entrance 1a to an exit 1b of the conveyer apparatus 1. This footstep guide rail 3 is provided to guide the movement of a plurality of footsteps 4 conveying passengers thereon. That is, the footsteps 4 are provided with footstep rollers 5, respectively. With the movement of the footstep rollers 5 along the footstep guide rail 3, the respective footsteps 4 move from the entrance 1a of the conveyer apparatus 1 to the exit 1b in circulation.

The footstep guide rail 3 includes, on its outward side, a rail body 3a having a horizontal surface and a pusher rail 3b on the return side. Since the footstep rollers 5 are supported on the horizontal surface of the rail body 3a, the footsteps 4 moving on the outward side of the guide rail 3 translate from the entrance 1a toward the exit 1b in a direction of arrow A of FIG. 2 while exposing their respective step surfaces to the outside of the structure 2, at the same level as the road surface substantially. Note, in the vicinity of the entrance 1a and the exit 1b on the outward side, comb plates 6 are provided, at respective tips, with combs. The footsteps 4 travel under the comb plate 6.

On the return side, the footsteps 4 return from the exit 1b to the entrance 1a under condition that the footstep rollers 5 are engaged between the rail body 3a and the pusher rail 3b. Additionally, a movable rail 3c capable of moving away from the rail body 3a is arranged on one side of the rail body 3a close to the entrance 1a.

By an endless footstep chain 7, the footstep rollers 5 allocated to the respective footsteps 4 are connected with each other in sequence at predetermined pitches, so that the plural footsteps 4 are integrated with the footstep chain 7. Under condition that the footstep rollers 5 of the respective footsteps 4 are abutting against the footstep guide rail, when a chain driving mechanism drives the footstep chain 7, the respective footsteps 4 move between the entrance 1a and the exit 1b without producing any gap, being guided by the footstep guide rail 3.

In the chain driving mechanism, the footstep chain 7 is wound, at its turn-over part, around a drive sprocket 9 rotated by driving force of a drive motor 8. Thus, the driving force of the drive motor 8 is transmitted to the footstep chain 7 through the drive sprocket 9.

The drive motor 8 as a driving-force source is disposed in the structure 2 and associated with the drive sprocket 9 through a drive chain 10. On the side of the exit 1b of the conveyer apparatus 1, the drive sprocket 9 is rotatably arranged in the structure 2. Rotating owing to the driving force of the drive motor 8, the drive sprocket 9 operates to transmit the driving force of the drive motor 8 to the footstep chain 7. That is, since the drive sprocket 9 rotates at a designated circular speed (i.e. pitch-circle velocity) owing to the driving force of the drive motor 8 while meshing, between adjoining gear teeth, with the footstep rollers 5 connected with each other through the footstep chain 7, the drive sprocket 9 operates to feed the footstep chain 7 and also the footstep rollers 5 connected to the chain 7. The conveyer apparatus 1 of the present invention utilizes a small-diameter sprocket having a small number of teeth (e.g. approx. sixteen teeth) as the drive sprocket 9. By utilizing such a small-sized sprocket as the drive sprocket 9, it is possible to miniaturize the structure 2 and also possible to minimize the sizes of the whole conveyer apparatus, thereby requiring less installation space.

Further, the conveyer apparatus 1 is provided, on the side of the entrance 1a, with a driven sprocket 11 that is rotated by the drive sprocket 9 to feed the footstep chain 7 in cooperation with the drive sprocket 9. Having the substantially-same diameter as the drive sprocket 9, the driven sprocket 11 is rotatably arranged in the structure 2. The footstep chain 7 is wound around both of the driven sprocket 11 and the drive sprocket 9, also extending from the former to the latter.

This driven sprocket 11 is urged by a spring member 12 of a chain tensional mechanism in a direction away from the drive sprocket 9, applying an appropriate tension to the footstep chain 7. Then, if an elongation is produced in the footstep chain 7, an urging force of the spring member 12 of the chain tensional mechanism allows the driven sprocket 11 to move in a direction away from the drive sprocket 9 within a predetermined range, preventing the footstep chain 7 from loosening. Note, when the driven sprocket 11 moves, the above-mentioned movable rail 3c of the footstep guide rail 3 also moves in a direction away from the drive sprocket 9 in association with the sprocket 11 owing to urging force of the spring member 12 of the chain tensional mechanism.

In the course of changing from the rollers' straight movement following the footstep guide rail 3 to their curved movement following the drive sprocket 9, meanwhile, the footstep rollers 5 moving along the footstep guide rail 3 upon the connection with the footstep chain 7 are subjected to an unevenness in the moving velocity of the roller 5 under the influence of meshing with the drive sprocket 9. The smaller the diameter of the drive sprocket 9 gets, the more remarkable the "velocity" evenness of the footstep rollers 5 does become. In such a case, the footsteps 4 are vibrated to cause then ride quality of the conveyer apparatus 1 to deteriorate.

Figure 2:
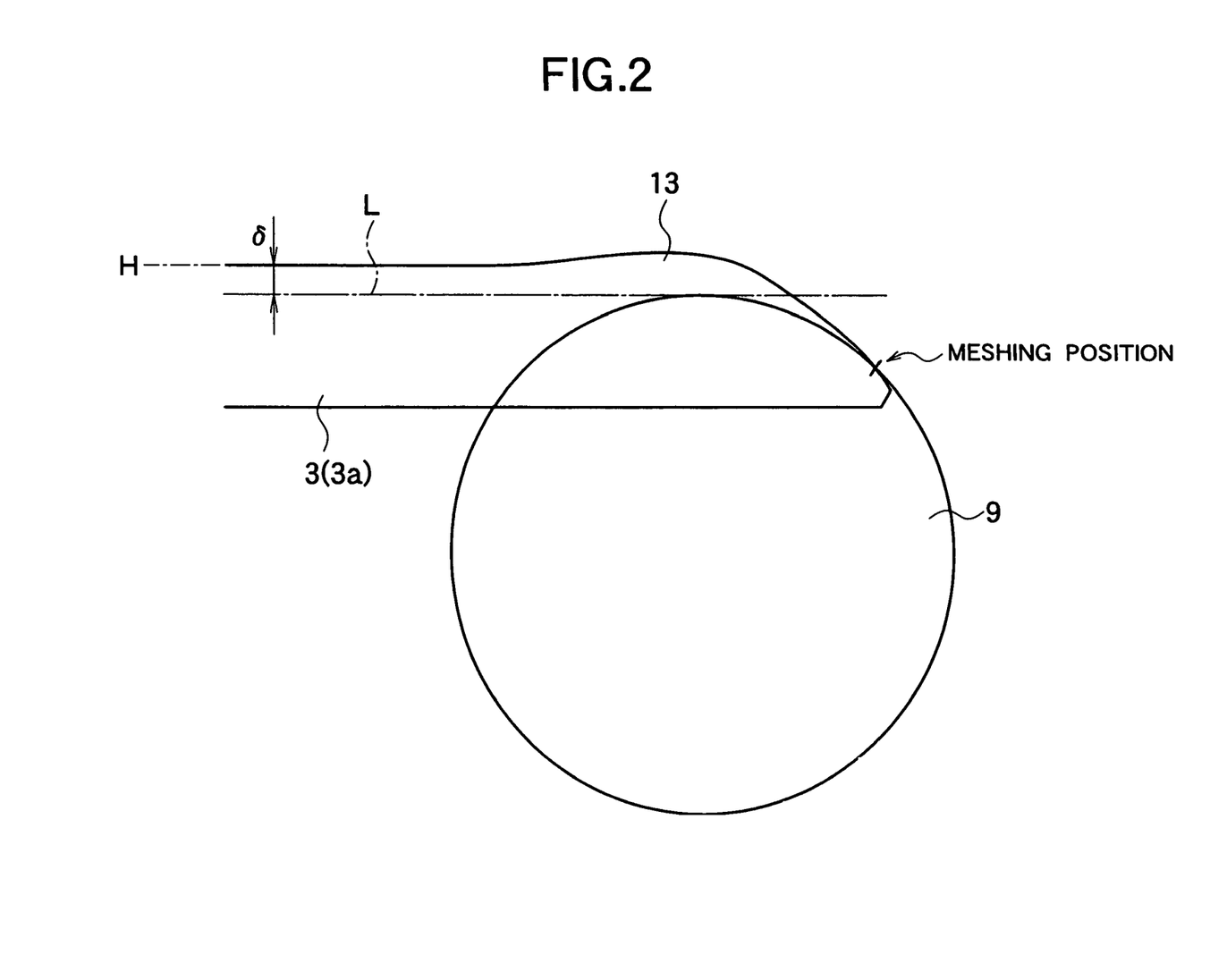
FIG. 2 is an enlarged view showing a characterizing portion of the conveyer apparatus, also showing a profile of a footstep guide rail on the introductory side of a drive sprocket typically.

In the conveyer apparatus 1 of the present invention, as shown in FIG. 2, a level H of the horizontal surface of the rail body 3a of the footstep guide rail 3 is established to a position obtained by adding a predetermined offset δ to a tangential line L of the drive sprocket 9 along the above horizontal surface and further, a curved part having a raised bump 13 is formed at an end of rail body 3a on the introductory side of the drive sprocket 9. Thus, by allowing the footstep roller 3 approaching the drive sprocket 9 to traveling from the horizontal surface at the level resulting from the addition of the predetermined offset δ to the tangential line L of the drive sprocket 9 to the meshing position with the sprocket 9 via the curved part 13, the velocity unevenness of the footstep roller 5 is absorbed. Note, the tangential line L of the drive sprocket 9 is a tangential line in contact with a circle (chain pitch circle) passing through respective bottoms each between adjoining teeth of the sprocket 9, parallel to the horizontal surface of the footstep guide rail 3.

This conveyer apparatus 1 further includes additional curved parts with bumps 13 at the other end (return side) of the footstep guide rail 3 on the side of the drive sprocket 9 and at both ends (outward and return sides) of the movable rail 3c on the side of the driven sprocket 11. Near the drive sprocket 9 and the driven sprocket 11, the footstep rollers 5 moves while describing the tracks corresponding to the profiles of the curved parts 13.

So long as the above curved part 13 is formed on at least one end of the rail body 3a on the introductory side of the drive sprocket 9, it is possible to absorb the velocity unevenness of the footstep rollers 5 effectively thereby making their movement smooth and also possible to restrain vibrations of the footsteps 4 effectively. Nevertheless, owing to the additional provision of the curved part 13 at the other end (return side) of the footstep guide rail 3 on the side of the drive sprocket 9, even if operating the conveyer apparatus 1 in reverse, it is possible to make the movement of the footstep rollers 5 smooth, restraining vibrations of the footsteps 4 effectively.

Further, the rotating speed of the driven sprocket 11 has a tendency to be unstable under the influence of the velocity unevenness of the footstep rollers 5. By providing the curved parts 13 at both ends (outward and return sides) on the side of the driven sprocket 11, however, it is possible to restrain even the velocity unevenness of the footstep rollers 5 on the side of the driven sprocket 11 effectively, stabilizing the rotating speed of the sprocket 11 and also possible to restrain the vibration of the footsteps 4 more effectively. Additionally, it is possible to make the conveyer apparatus 1 address the reverse operation.

We now describe a mechanism for absorbing the velocity unevenness of the footstep rollers 5 in the above-mentioned conveyer apparatus 1 more in detail.

Figure 3:
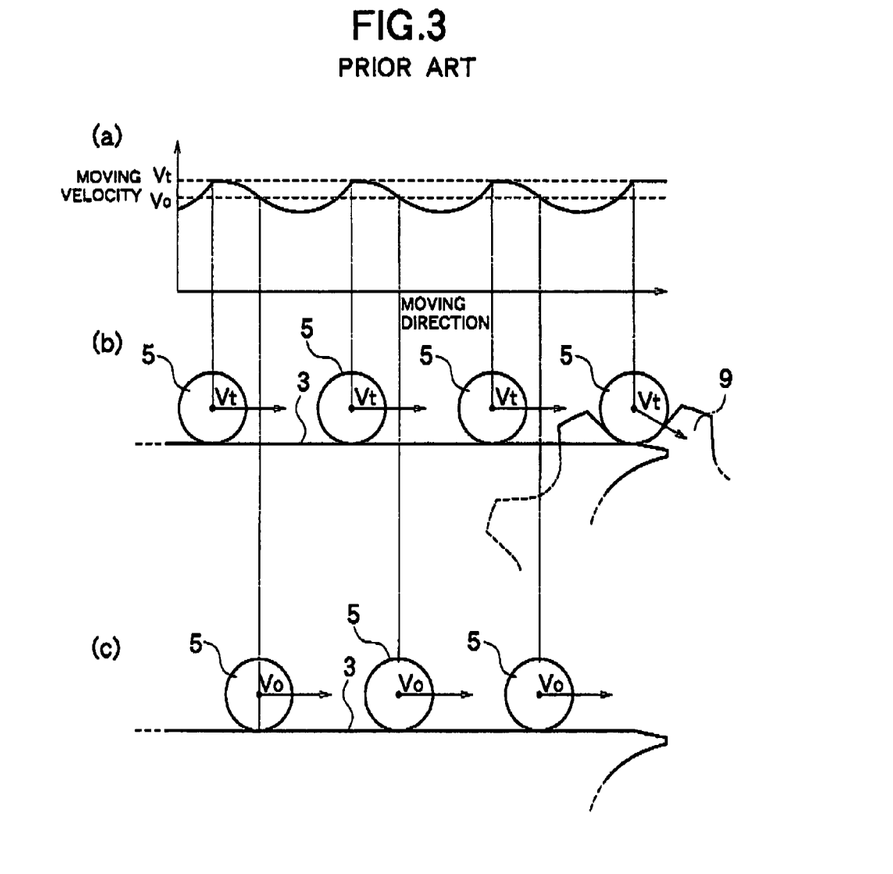
FIG. 3 is a group of views explaining a relationship between moving velocities of footstep rollers and their positions in case of zero in the offset value of the horizontal surface of the footstep guide rail, in which (a) is a view showing changes in the moving velocity of the footstep rollers corresponding to their positions; (b) is a view showing positions where the moving velocity of the footstep roller becomes a pitch-circle velocity Vt of a drive sprocket; and (c) is a view showing positions where the moving velocity of the footstep roller becomes a target average velocity Vo.

First, we consider a situation that the above-mentioned offset δ is zero, namely, the horizontal surface of the footstep guide rail 3 is level with the tangential line of the drive sprocket 9. Then, since the circular drive sprocket 9 drives the footstep rollers 5 linearly moving on the horizontal surface, velocity unevenness is produced in the footstep rollers 5, as shown in FIG. 3(a). Provided that a pitch-circle velocity (circular speed) of the drive sprocket 9 is represented by Vt, each footstep roller 5 is subjected to such velocity unevenness that the velocity Vt is once decelerated and subsequently accelerated to the velocity Vt. Provided herein that a target average velocity of each footstep roller 5 is represented by Vo, when the footstep rollers 5 are at respective positions shown in FIG. 3(b) on the footstep guide rail 3, the moving velocity of each footstep roller 5 comes to Vt. Subsequently, when the footstep rollers 5 reach respective positions of FIG. 3(c) as a result of advancing against the drive sprocket 9 by a predetermined distance while reducing the moving velocities from the above positions, the moving velocity of each footstep roller 5 comes to the target average velocity Vo.

Figure 4:
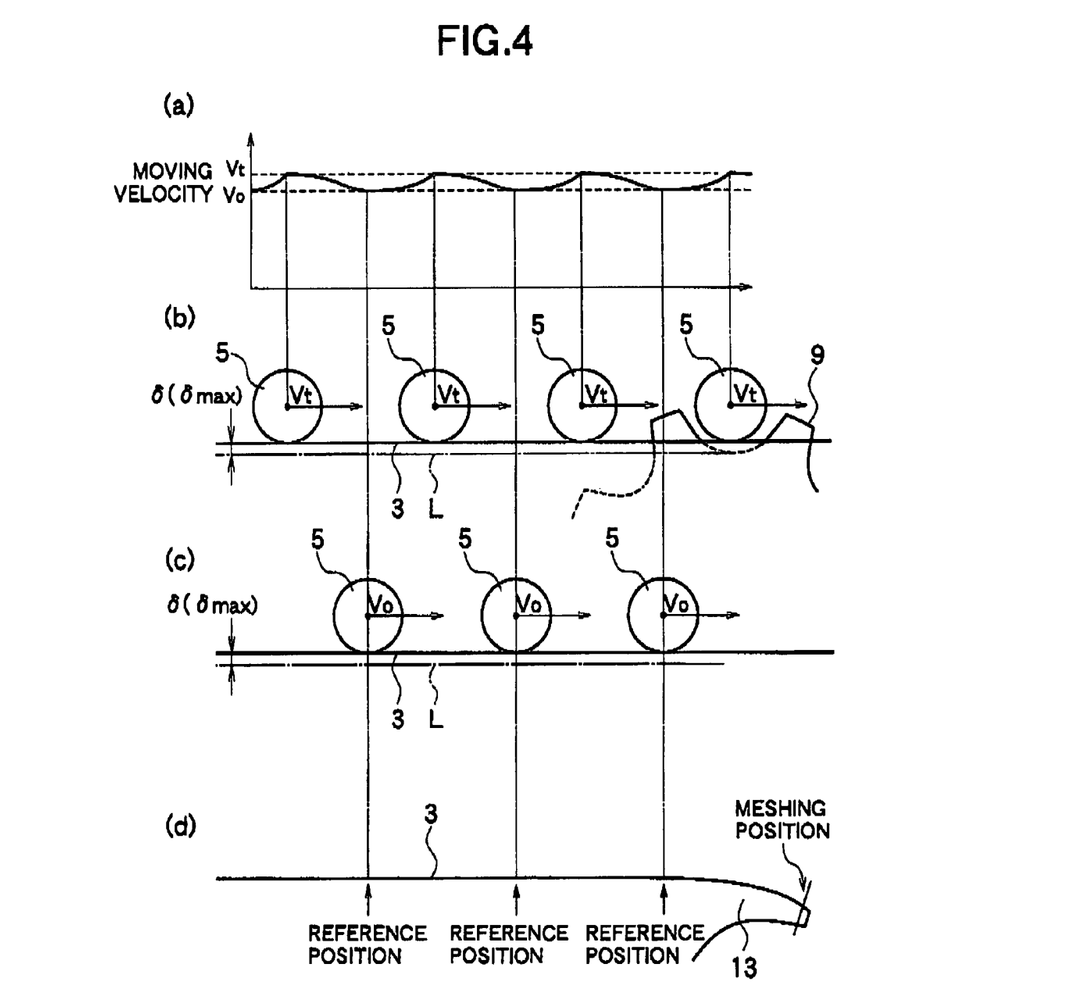
FIG. 4 is a group of views explaining a relationship between moving velocities of footstep rollers and their positions in case of an optimal value in the offset value of the horizontal surface of the footstep guide rail, in which (a) is a view showing changes in the moving velocity of the footstep rollers corresponding to their positions; (b) is a view showing positions where the moving velocity of the footstep roller becomes a pitch-circle velocity Vt of a drive sprocket; (c) is a view showing positions where the moving velocity of the footstep roller becomes a target average velocity Vo; and (d) is a view showing a turning point at which the horizontal surface of the footstep guide rail is changed to a curved part.

Here, suppose a situation that the level of the horizontal surface of the footstep guide rail 3 is set higher than the tangential line of the drive sprocket 9. Then, the degree of deceleration of each footstep roller 5 is softened corresponding to a value for the offset δ. Further, if the offset δ is set to an optimal value, then the moving velocity of each footstep roller 5 once changes from Vt to Vo in deceleration and subsequently increases again without falling under Vo, as shown in FIG. 4(a). In connection, it should be noted that if setting a value more than the above optimal value for the offset δ, the average moving velocity of each footstep roller 5 will always exceed the target average velocity Vo. For this reason, the above optimal value will be an upper limit (δ max) of settable values for the offset δ. Provided herein that the drive sprocket 9 is of 348.4 mm in the pitch-circle diameter and eight teeth and the link length of the footstep chain 7 is 133.33 mm, the optimal value (upper limit) δ max is 5.1 mm according to the inventors' estimation.

As mentioned above, on condition that the level of the horizontal surface of the footstep guide rail 3 is set to a position where the appropriate offset δ max is added to the tangential line of the drive sprocket 9, when the footstep rollers 5 are at respective positions shown in FIG. 4(b) on the footstep guide rail 3, the moving velocity of each footstep roller 5 comes to Vt. Subsequently, when the footstep rollers 5 reach respective positions of FIG. 4(c) as a result of advancing against the drive sprocket 9 by a predetermined distance while gradually reducing the moving velocities from the above positions, the moving velocity of each footstep roller 5 comes to the target average velocity Vo.

Assuming that a position where the moving velocity of the footstep roller 5 changes from Vt to Vo in deceleration is defined as "reference position", there exist a plurality of reference positions along the footstep guide rail 3, as shown in FIG. 4(d). In these reference positions, the closest reference position to the drive sprocket 9 is referred to as a "turning point", corresponding to a boundary between the horizontal surface of the footstep guide rail 3 and the above-mentioned curved part 13.

Among the footstep rollers 5 connected with each other through the footstep chain 7, when one footstep roller 5 close to the drive sprocket 9 travels along the curved configuration of the curved part 13 while changing its level, the velocity unevenness of the above footstep roller 5 is absorbed. That is, as the velocity unevenness is not transmitted to the following footstep rollers 5, the moving velocities of the following footstep rollers 5 are maintained at the average velocity Vo.

As mentioned above, the curved part 13 has a function to eliminate the velocity unevenness of the other footstep roller 5 following one footstep roller 5 passing through the curved part 13. In the plural reference positions along the footstep guide rail 3 of the conveyer apparatus 1 of the present invention, since the closest reference position to the drive sprocket 9 is referred to as a "turning point", corresponding to a boundary between the horizontal surface of the footstep guide rail 3 and the above-mentioned curved part 13, it is possible to maintain the moving velocities of the footstep rollers 5 at the average velocity Vo all over area extending from the entrance 1a to the exit 1b.

Figure 5:
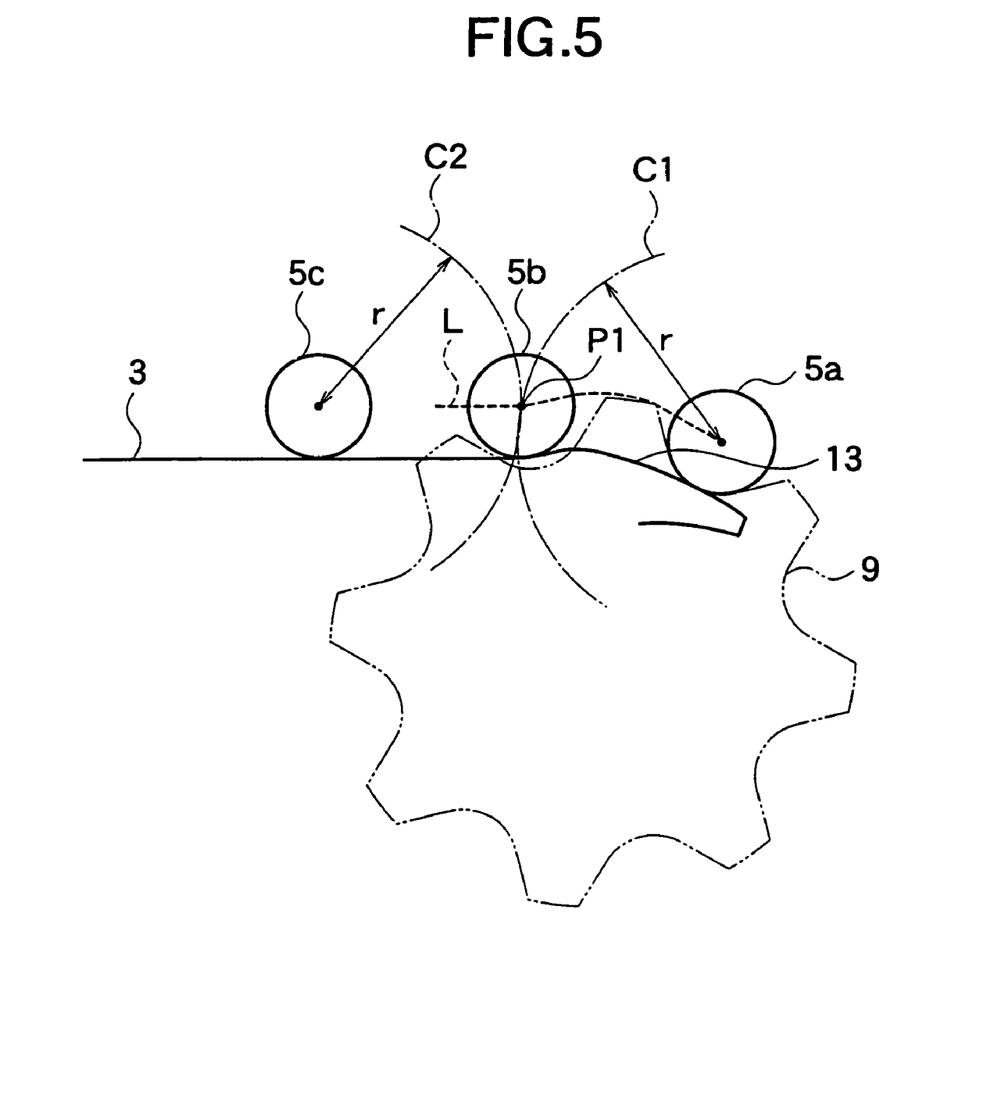
FIG. 5 is a typical view explaining an optimal profile of the curved part.

Next, the optimal profile for the curved part 13 will be described with reference to FIG. 5.

The moving velocity of a footstep roller 5 in the course of approaching the drive sprocket 9 over the curved part 13 becomes equal to a pitch circle velocity Vt when the same roller 5 meshes with the drive sprocket 9. Thus, a footstep roller 5 having the moving velocity of Vt as a result of meshing with the drive sprocket 9 will be called "sprocket roller 5a" for the sake of simplicity. Further, a footstep roller 5 secondary positioned from the sprocket roller 5a over the curved part 13 on the front side (i.e. side close to the entrance 1a of the conveyer apparatus 1) travels at a constant velocity (average velocity Vo) since a footstep roller 5b adjoining the velocity unevenness roller 5a moves along the curved part 13. Such a footstep roller, which is the second one in a direction from the sprocket roller 5a to the front side via the curved part 13 and which is expected to have a constant velocity, will be called "constant-velocity roller 5c", for the sake of simplicity.

Provided that a roller's center trace L represents the trace of an intersecting point P1 during moving of the respective footstep rollers 5a, 5b and 5c by one pitch each, it is desirable that the curved part 13 is formed so as to follow the roller's center trace L. Note, the intersecting point P1 are formed by an intersection of one circle C1 that can be described by both a center of the sprocket roller 5a and a link length r of the footstep chain 7 as the radius of the circle C1 with another circle C2 that can be described by both a center of the constant-velocity roller 5c and the link length r of the footstep chain 7 as the radius of the circle C2.

With the above establishment of the profile of the curved part 13, in the course of passing of the footstep roller 5b between the sprocket roller 5a and the constant-velocity roller 5c through the curved part 13, the velocity unevenness of the sprocket roller 5a can be completely absorbed by a change in the level of the footstep roller 5b corresponding to the profile of the curved part 13. Consequently, the moving velocity of the constant-velocity roller 5c is maintained at a constant velocity (average velocity Vo) precisely.

Figure 6:
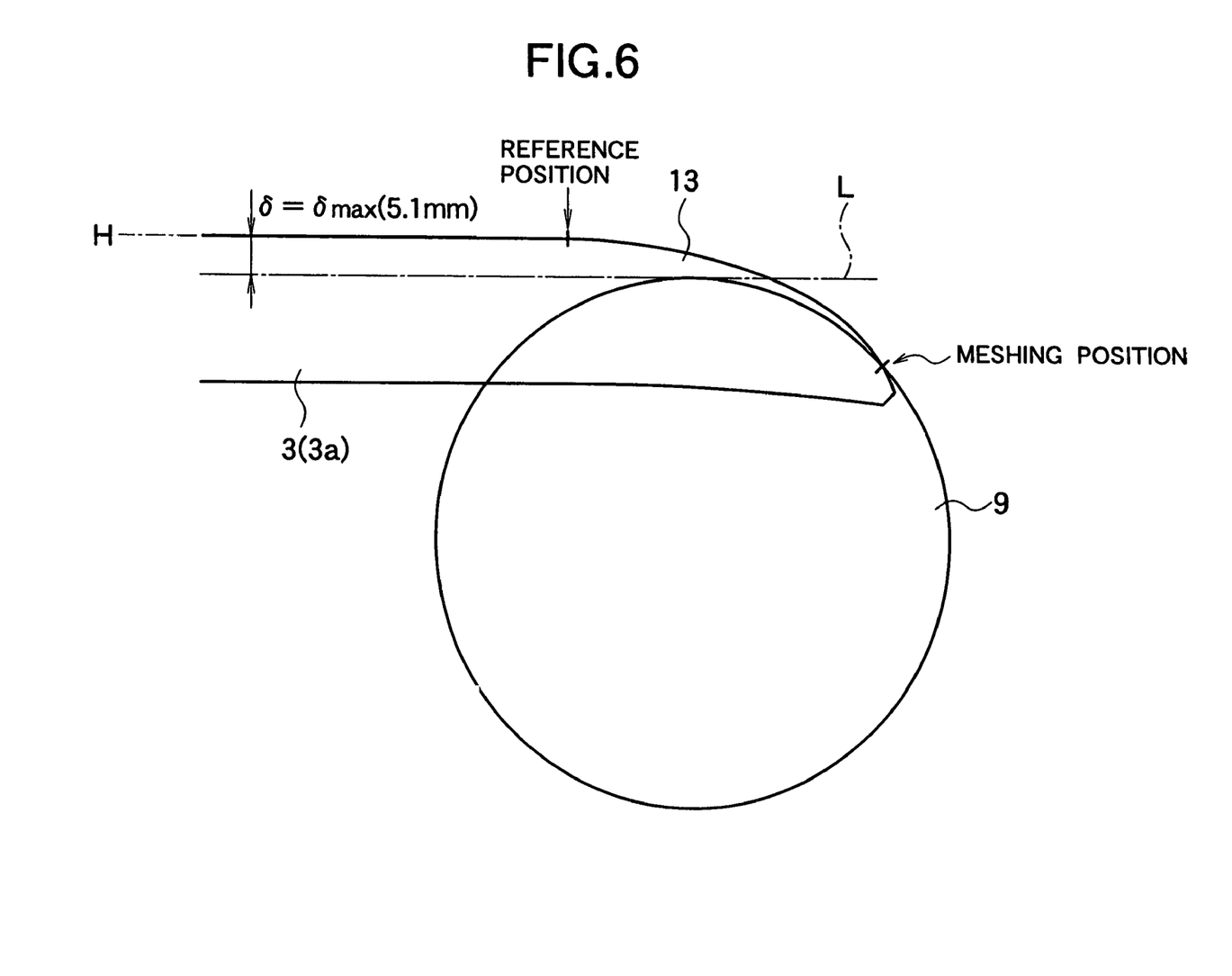
FIG. 6 is a view typically showing a profile of the footstep guide rail on the introductory side of the drove sprocket when the offset value in the level of the horizontal surface of the footstep guide rail is set to an optimal value.

Now assume that the drive sprocket 9 is formed with 348.4 mm in the pitch-circle diameter and eight teeth and the link length of the footstep chain 7 is 133.33 mm. If a value of δ max (=5.1 mm) is established for the offset of the horizontal surface of footstep guide rail 3 from the tangential line of the drive sprocket 9, then the above-mentioned center trace L describes a falling curve that gradually falls from the horizontal surface to the meshing position of the drive sprocket 9. Therefore, by forming the curved part 13 in a profile following the center trace L, then it becomes possible to form the curved part 13 only by the falling curve, as shown in FIG. 6. By introducing the footstep rollers 5 into the meshing position of the drove sprocket 9 along the falling curve of the curved part 13, it is possible to maintain the movement of the footstep rollers 5 at a substantially-fixed velocity. Further, as a peak of the curved part 13 is level with the horizontal surface of the guide rail 3, a vertical interval between the peak of the curved part 13 and the tangential line of the drive sprocket 9 results in just 5.1 mm.

We now describe the operation of the conveyer apparatus 1 constructed above.

First, when the drive motor 8 forming a driving source of the chain tensional mechanism is activated, the drive sprocket 9 rotates on receipt of a driving force of the drive motor 8, so that the rotation of the drive sprocket 9 allows the driving force of the drive motor 8 to be transmitted to the footstep chain 7. When the footstep chain 7 is driven, the respective footsteps rollers 4 of the plural footsteps 4 linked to each other by the footstep chain 7 move along the footstep guide rail 3 circulatively.

In the respective footsteps rollers 4 linked by the footstep chain 7, then, a footstep roller 5 approaching the drive sprocket 9 is subjected to unevenness in the moving velocity in the process of meshing with the drive sprocket 9. However, since the footstep roller 5 in process of approaching the drive sprocket 9 is adapted so as to travel from the horizontal surface of the footstep guide rail 3 to the meshing position of the drive sprocket 9 via the curved part 13, and the level of the horizontal surface is set to a height position as a result of adding the offset δ to the tangential line of the drive sprocket 9, the velocity unevenness of the above footstep roller 5 is not transmitted to the following footstep rollers 5, so that the velocity unevenness of the rollers 5 can be restrained.

Recognizing the importance of three adjacent footstep rollers 5a, 5b and 5c, we now describes the respective footstep rollers 5 connected with each other through the footstep chain 7, in detail. First, when the leading footstep roller 5a arrives at the meshing position of the drove sprocket 9, the moving velocity of the leading footstep roller 5a becomes a pitch-circle velocity Vt. At this time, if the second footstep roller 5b has reached the closest reference position to the drive sprocket 9, then the second footstep roller 5b makes the transition from the horizontal surface to the curved part 13 and subsequently moves along the curved part 13 while changing its height position.

As a pitch (link length) between the respective footstep rollers 5 is constant, this change in the height of the second footstep roller 5b causes the third footstep roller 5c to approach the leading footstep roller 5a by just the height change, of the second footstep roller 5b much, so that the third footstep roller 5c is accelerated. Consequently, a velocity descent of the leading footstep roller 5b is cancelled by a velocity ascent of the third footstep roller 5c, so that the moving velocity of the third footstep roller 5c is maintained at the average velocity Vo.

In the conveyer apparatus 1 of the present invention, as mentioned above, it is established that the horizontal surface of the footstep guide rail 3 is set a level on a height position obtained by adding the designated offset δ to the tangential line of the drive sprocket 9. Further, the footstep guide rail 3 is provided, at its end on the introductory side of the drive sprocket 9, with a curved part 13. Additionally, the conveyer apparatus 1 is constructed so as to absorb the velocity unevenness of the footstep rollers 5 by changing the contour of the footstep guide rail 3 from the horizontal surface to the curved part at the closest reference position to the drive sprocket 9. In this way, it is possible to suppress vibrations of the footsteps 4 whereby the comfortable ride quality of the apparatus can be ensured. As mentioned above, additionally, since a vertical interval that may be required to absorb the velocity unevenness of the footstep rollers 5 is remarkably minute, it is possible to miniaturize the structure 2, realizing the minimized size of the apparatus 1 as a whole.

Moreover, if establishing an optimal value for the offset δ of the horizontal surface of the footstep guide rail 3, then it is possible to form the curved part 13 only by a falling curve. With the formation of the curved part 13, there is no possibility that each footstep roller 5 is lifted up at the time of passing through the curved part 13. Namely, there is no need to provide a pusher member for preventing the footstep rollers 5 from being lifted up.

Again, in the above-mentioned arrangement where the curved parts 13 are formed not only at the "outward-side" end of the footstep guide rail 3 on the introductory side of the drive sprocket 9 but also at the "return side" end of the footstep guide rail 3 on the side of the drive sprocket 9, it is possible to suppress the velocity unevenness of the footstep rollers 5 effectively even if the conveyer apparatus 1 is driven in reverse. Further, in the arrangement where the curved parts 13 are also formed on both outward and return sides of the movable rail 3c on the side of the entrance 1a of the conveyer apparatus 1 (i.e. the side of the driven sprocket 11), it is possible to suppress even the velocity unevenness on the side of the driven sprocket 11 effectively.

Figure 7:
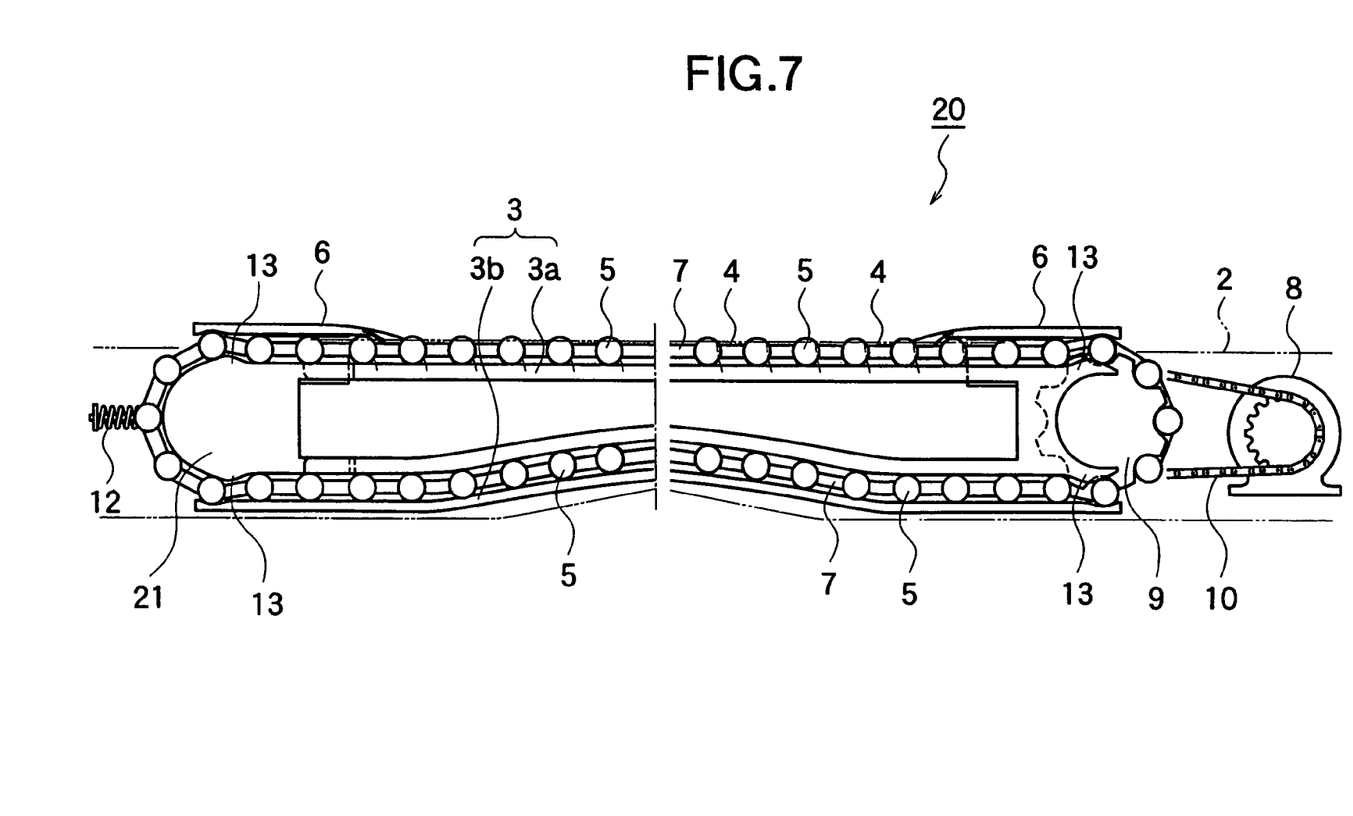
FIG. 7 is a whole structural view showing another example of the conveyer apparatus on application of the present invention.

Note, the above-mentioned conveyer apparatus 1 is just one specific applicable example of the present invention and therefore, a variety of modifications may be made without any departure from the purpose of the present invention. In the above-mentioned conveyer apparatus 1, for instance, the footstep chain 9 is spanned between the drive sprocket 9 and the driven sprocket 11. As shown in FIG. 7, on condition of employing a substantial-U shaped movable rail 21 in place of the driven sprocket 11, the footstep chain 7 may be spanned between the drive sprocket 9 and the movable rail 21. In FIG. 7, since a conveyer apparatus 20 is constructed similarly to the above-mentioned conveyer apparatus 1 except for the above features, elements similar to those of the above-mentioned conveyer apparatus 1 are respectively indicated with the same reference numerals and their descriptions are eliminated.

The movable rail 21 is provided, at its part for engagement with the footstep chain 7, with a round part having a substantially-same diameter as that of the drive sprocket 9. Putting the footstep rollers 7 connected by the footstep chain 7 in contact with the circumference of the round part, the movable rail 21 operates to guide the movement of the footstep rollers 5. As similar to the driven sprocket 11 of the above-mentioned conveyer apparatus 1, this movable rail 21 is urged in a direction away from the drive sprocket 9 by the spring member 12 of the chain tensional mechanism, applying an appropriate tension on the footstep chain 7.

In the movable rail 21 like this, if the velocity unevenness is produced in the footstep rollers 5, there arises a possibility that the movable rail 21 shakes in directions to approach and leave the drive sprocket 9. Therefore, in case of adopting the movable rail 21 like this, it is desirable to form the above-mentioned curved parts 13 in the vicinity of the round part (outward and return sides) of the movable rail 21. Then, owing to the formation of the curved parts 13 near the round part of the movable rail 21, the velocity unevenness of the footstep rollers 5 is suppressed on the side of the movable rail 21 effectively. Consequently, not only vibrations of the footsteps 4 but also vibration of the movable rail 21 can be effectively restrained to make the ride quality of the conveyer apparatus 1 remarkably favorable. Additionally, owing to the provision of the curved parts 13 on both outward and return sides of the movable rail 21, it is possible to cope with the reverse driving of the conveyer apparatus 20 too.

The above descriptions are related to an example of applying the present invention on a moving walkway that is arranged near-horizontally to the road surface to convey passengers. Further, the present invention is also applicable to an escalator straddling upper and lower floors in a building to convey passengers effectively.

Further, it is noted that the moving walkway and the escalator include changing portions each between the straight part and the arc part of the footstep guide rail besides the above introductory parts for the drive sprocket and the driven sprocket and both ends of the movable rail. The technological idea of the invention is effectively applicable to such all the changing portions of such a footstep guide rail.

Figure 8:
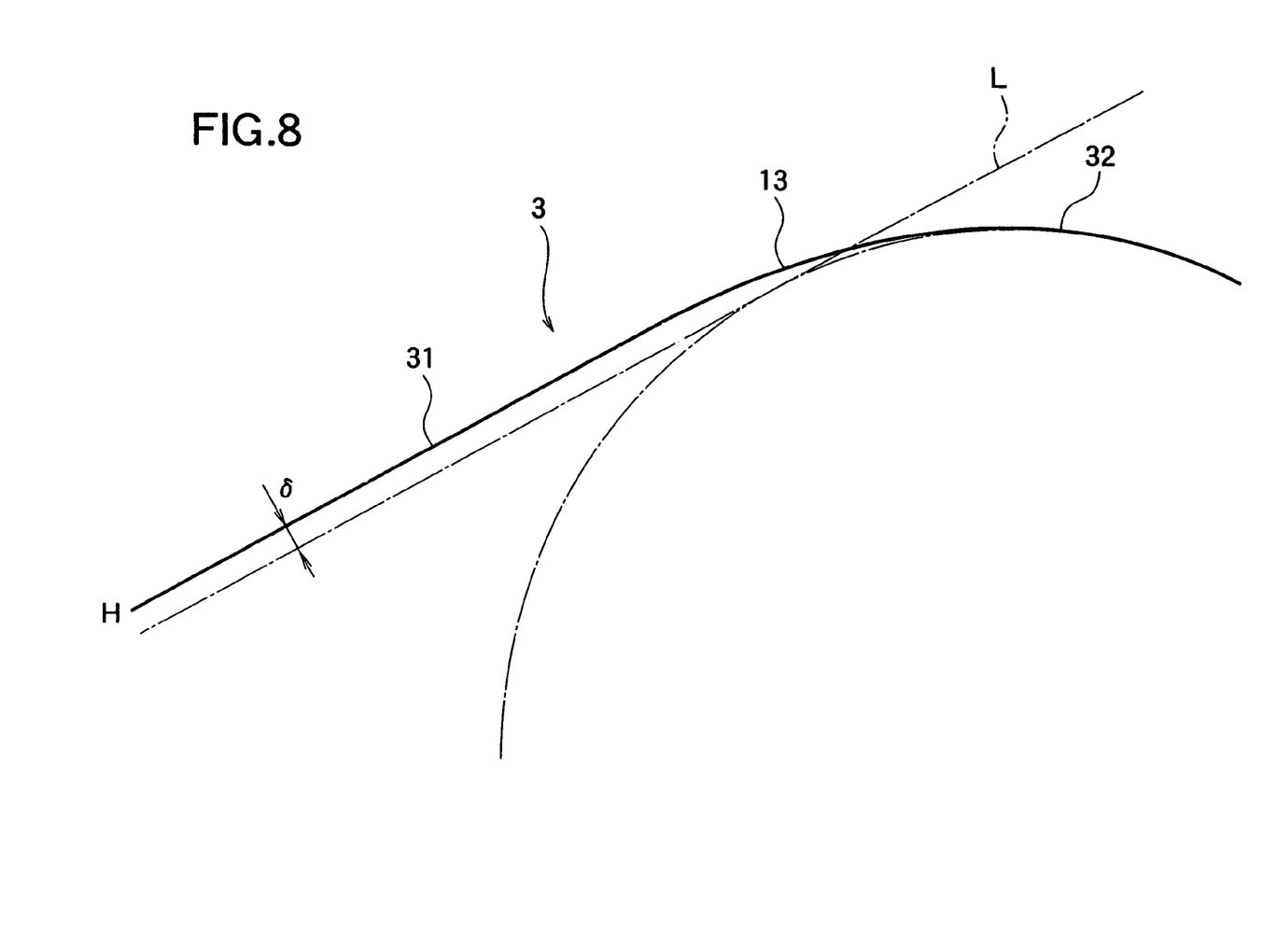
FIG. 8 is an enlarged view showing a characterizing portion in a still further example of the conveyer apparatus on application of the present invention, also showing a profile of the footstep guide rail at a change part at which a straight part is changed to an arc part.

That is, as shown in FIG. 8, it is established in the footstep guide rail 3 having a straight part 31 and an arc part 32 that a level H of a horizontal surface in case of regarding the straight part 31 as horizontal, is set at a level on a position obtained by adding a designated offset δ to a tangential line L of the arc part 32 along the horizontal surface, at a changing portion from the part 31 to the part 32. Additionally, the footstep guide rail 3 is provided, at the changing portion for the arc part 32, with a curved part 13. Then, each of the footstep rollers 5, which travels on the straight part 31 at a level as a result of the addition of the designated offset δ to the tangential line L of the arc part 32, is adapted so as to arrive at the arc part 32 through the curved part 13. Consequently, as similar to the above-mentioned example, the velocity unevenness of the footstep rollers 5 can be absorbed to restrain vibration of the footsteps 4 due to the velocity unevenness, whereby it becomes possible to ensure the comfortable ride quality of the apparatus furthermore.

The fundamental principle that the provision of the curved part 13 allows the velocity unevenness of the footstep rollers 5 to be absorbed at the changing portion from the straight part 31 to the arc part 32, is similar to that of the above-mentioned cases where the curved parts 13 are arranged on the rail's introductory ends for the drive sprocket 9 and the driven sprocket 11 and also in the movable rail 21.

First, we consider a situation that the above-mentioned offset δ is zero, namely, situation that a level H of the horizontal surface of the footstep guide rail 3 is level with the tangential line of the arc part 32 on condition of regarding the straight part 31 of the footstep guide rail 3 as being horizontal. Then, since the footstep rollers 5 linearly moving on the horizontal surface till then have to travel on the arc part 32, the footstep rollers 5 are subjected to unevenness in moving velocity. Thus, providing that Vt' represents a pitch-circle velocity of one footstep roller 5 moving on the arc part 32, each footstep roller 5 is subjected to a velocity unevenness that a velocity is once decelerated from Vt' and subsequently accelerated up to Vt'. Providing herein that Vo' represents a target average velocity of each footstep roller 5, the moving velocity of each footstep roller 5 once becomes Vt' and thereafter, it is gradually decelerated to be the target average velocity Vo' with an advance toward the arc part 32 by a predetermined distance.

Now, if establishing a level of the horizontal surface of the straight part 31 of the footstep guide rail 3 higher than the tangential line of the arc part 32, then the deceleration rate of each footstep roller 5 is reduced corresponding to a value for the offset δ. Further, if setting an optimal value for the offset δ, then the moving velocity of each footstep roller 5 once changes from Vt' to Vo' in deceleration and subsequently, the velocity is again increased without falling under Vo'. In connection, it should be noted that if setting a value more than the above optimal value for the offset δ, the average moving velocity of each footstep roller 5 will always exceed the target average velocity Vo'. For this reason, this optimal value will be an upper limit (δ max) that can be set for the offset δ. Provided herein that the arc part 32 of the footstep guide rail 3 is formed with 500 mm in the curvature radius and the footstep chain 7 is 133.33 mm in link length, the optimal value (upper limit) δ max is 1.8 mm according to the inventors' estimation.

As mentioned above, when the level of the horizontal surface of the straight part 31 of the footstep guide rail 3 is set to a position obtained by adding the optimal offset δ max to the tangential line of the arc part 32, the moving velocity of each footstep roller 5 becomes Vt on the footstep guide rail 3. From this position, when the footstep roller 5 advances toward the arc part 32 by a predetermined distance while gradually reducing the moving velocities, the moving velocity of each footstep roller 5 becomes the target average velocity Vo'.

Here, it is defined that "reference position" designates a positions where the moving velocity of the footstep roller 5 is reduced from Vt' to Vo' in deceleration. Among a plurality of reference positions existing along the footstep guide rail 3, the closest reference position to the arc part 32 is established as "turning point" as a boundary between the straight part 31 of the footstep guide rail 3 and the above-mentioned curved part 13. Among the footstep rollers 5 connected with each other through the footstep chain 7, when one footstep roller 5 close to the drive sprocket 9 travels along the curved configuration of the curved part 13 while changing its level, the velocity unevenness of this footstep roller 5 is absorbed. That is, as the velocity unevenness is not transmitted to the following footstep rollers 5, the moving velocities of the following footstep rollers 5 are maintained at the average velocity Vo'.

The optimal profile of the curved part 13 at the changing portion between the straight part 31 and the arc part 32 of the footstep guide rail 3 is similar to the optimal profile of the curved parts 13 each formed on the introductory ends for the drive sprocket 9 and the driven sprocket 11 and also formed in the movable rail 21.

Thus, after transferring from the straight part 31 of the footstep guide rail 3 to the arc part 32 through the curved part 13, a footstep roller 5 moves on the arc part 32 at a pitch-circle velocity Vt'. Here, the footstep roller 5 traveling on the arc part 32 of the footstep guide rail 3 at the moving velocity Vt will be called "arc-part roller" for the sake of simplicity. Further, one footstep roller 5, which is secondary positioned from this arc-part roller over the curved part 13 on the front side (i.e. on the side of the straight part 31), travels at a constant velocity (average velocity Vo') since another footstep roller adjoining the arc-part roller moves along the curved part 13. Such a footstep roller, which is the second one in a direction from the arc-part roller to the front side via the curved part 13 and which is expected to have a constant velocity, will be called "constant-velocity roller", for the sake of simplicity.

Provided that a roller's center trace represents the trace of an intersecting point during moving of the respective footstep rollers by one pitch each, it is desirable that the curved part 13 is formed so as to follow the roller's center trace. Note, the intersecting point is formed by an intersection of one circle that can be described by both a center of the arc-part roller and a link length of the footstep chain 7 as the radius of the circle with another circle that can be described by both a center of the constant-velocity roller and the link length of the footstep chain 7 as the radius of the other circle.

With the above establishment in the profile of the curved part 13, in the process that one footstep roller between the arc-part roller and the constant-velocity roller passes through the curved part 13, the velocity unevenness of the arc-part roller can be completely absorbed due to a change in the level of the footstep roller corresponding to the profile of the curved part 13, theoretically. Consequently, the moving velocity of the constant-velocity roller is maintained at a constant velocity (average velocity Vo') precisely.

Now assume that the arc part 32 of the footstep guide rail 3 is shaped of 500 mm in the curvature radius and the link length of the footstep chain 7 is 133.33 mm. If a value of δ max (=1.8 mm) is established for the offset δ of the level of the straight part 31 from the tangential line of the arc part 32 of the footstep guide rail 3, then the above-mentioned roller's center trace describes a falling curve that gradually falls from the straight part 31 of the footstep guide rail 3 to the curved part 32. Therefore, by forming the curved part 13 in a profile following this roller's center trace, then it becomes possible to form the curved part 13 only by the falling curve. By introducing the footstep rollers 5 into the arc part 32 along the falling curve of the curved part 13, it is possible to maintain the moving velocity of the footstep rollers 5 at a substantially-constant speed. Further, as a peak of the curved part 13 is level with the straight part 31 of the guide rail 3, a vertical interval between the peak of the curved part 13 and the tangential line of the arc part 32 is just 1.8 mm.

As for the formation of a curved part 13 at the changing portion from the straight part 31 to the arc part 32 of the footstep guide rail 3, since the arc part 32 is not subjected to a constraint of the number of teeth, such as the drive sprocket 9, the establishment of the straight part 31 of the footstep guide rail 3 at a height position resulting from adding the designated offset δ may be replaced by subtracting a designated offset δ from the curvature radius of the arc part 31 of the footstep guide rail 3.

Figure 9:
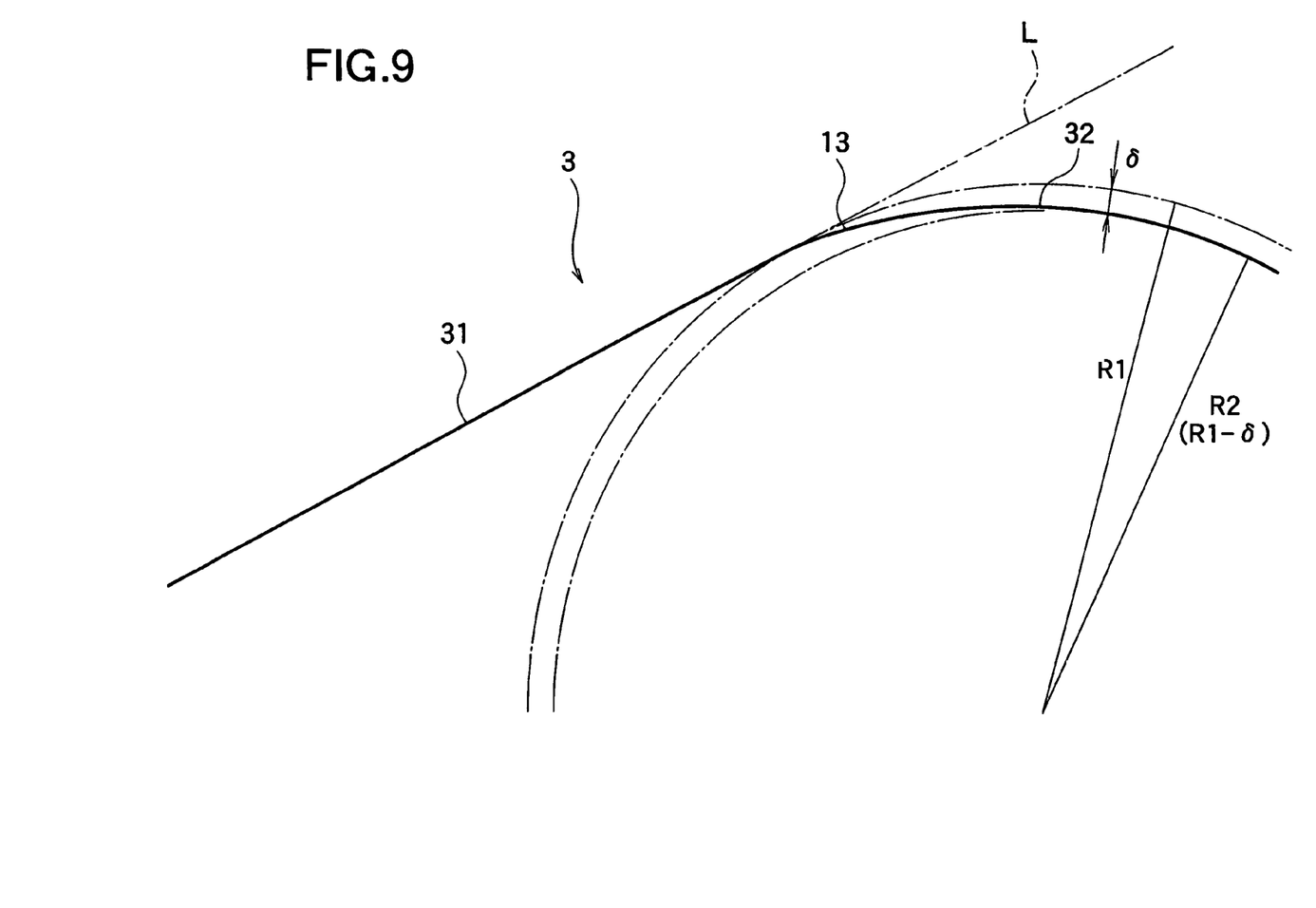
FIG. 9 is an enlarged view showing a characterizing portion in a still further example of the conveyer apparatus on application of the present invention, also showing a profile of the footstep guide rail at a change part at which a straight part is changed to an arc part.

Thus, as shown in FIG. 9, at the changing portion from the straight part 31 to the arc part 32 of the footstep guide rail 3 having the straight part 31 and the arc part 32, it is executed upon regarding the horizontal part 31 as being horizontal to make the curvature radius of the arc part 32 equal to a curvature radius R2 obtained by subtracting a designated offset δ from a curvature radius R1 of an arc in contact with the resulting horizontal surface. Additionally, a curved part 13 is provided at the changing portion from the straight part 31 of the footstep guide rail 3 to the arc part 32 having the curvature radius R2. Thus, the apparatus is constructed so that the footstep rollers 5 each traveling on the straight part 31 of the footstep guide rail 3 reach the arc part 32 of the curvature radius R2 through the curved part 13. Consequently, as similar to the above-mentioned examples, the velocity unevenness of the footstep rollers 5 is absorbed to restrain the vibration of the footsteps 4 due to the velocity unevenness of the footstep rollers 5, whereby more comfortable ride quality can be ensured.

Note, descriptions about the principle that the provision of the curved part 13 allows the velocity unevenness of the footstep rollers 5 to be absorbed and also the optimal profile of the curved part 13 are eliminated herein because of its similarity to those in the above-mentioned examples.

Assume hereat that the arc in contact with the straight part 31 of the footstep guide rail 3 is shaped of 500 mm in the curvature radius R1. Then, if establishing so that the offset δ to be subtracted from the curvature radius R1 becomes a value (=1.806 mm) substantially equal to the optimal offset δ max (upper limit) to be added to the straight part 31 in the above-mentioned example, then the curved part 13 exhibits a falling curve that gradually falls from the straight part 31 to the curved part 32 of the curvature radius R2. Accordingly, by introducing the footstep rollers 5 into the arc part 32 along the falling curve of the curved part 13, it is possible to maintain the moving velocity of the footstep rollers 5 at a substantially-constant speed and also possible to afford the comfortable ride quality with restriction of vibration of the footsteps 5.

INDUSTRIAL APPLICABILITY OF THE INVENTION

According to the present invention, since the conveyer apparatus is constructed so as to absorb the velocity unevenness of each footstep roller due to its passage through the curved part in the course of changing from straight movement to circular movement, it is possible to restrain vibration of the footsteps due to the velocity unevenness of the footstep rollers, ensuring a comfortable ride quality. Additionally, as a vertical interval that may be required to absorb the velocity unevenness of the footstep rollers is remarkably minute, it is advantageous in realizing a minimized size of the apparatus as a whole.

The invention claimed is:

1. A conveyer apparatus for minimizing vibration, comprising:
    a footstep guide rail;
    a plurality of footsteps having footstep rollers moving along the footstep guide rail;
    a footstep chain for connecting the footstep rollers of the plurality of footsteps each other at predetermined pitches;

a rotating device for generating a driving force to move the footsteps in a designated direction; and a drive sprocket rotated by the driving force of the rotating device and transmitting the driving force of the rotating device to the footstep chain, wherein the footstep guide rail is arranged so that a horizontal surface thereof is set at an elevation position obtained by adding a designated offset amount to a tangential line of the drive sprocket along the horizontal surface, and the footstep guide rail is provided, at its one end on an introductory side of the drive sprocket, with a curved part that is projected or recessed from the horizontal surface, and in the case where "Vt" represents a pitch-circle velocity of the drive sprocket, "Vo" represents a target average velocity of one of the footstep rollers connected and moved by the footstep chain and "reference position" represents a position where a velocity of the footstep roller becomes "Vo" as a result of its decelerating from "Vt", one of a plurality of "reference positions" existing along the footstep guide rail, which is the closest to the drive sprocket, is established as a turning point from the horizontal surface of the footstep guide rail to the curved part.

2. The conveyer apparatus of claim 1, wherein
the designated offset amount is a value that is established so as not to cause the velocity of the footstep roller to fall less than "Vo" in succession to a deceleration from "Vt" to "Vo" at the reference position.

3. The conveyer apparatus of claim 1, wherein, in the case where "sprocket roller" represents one footstep roller being meshing with the drive sprocket, "constant-velocity roller" represents another footstep roller which is the second one from the sprocket roller and of which velocity is expected to be constant and "introductory-roller's center trace" represents a trace of an intersecting point of first and second circles tracking during moving of the sprocket roller and the constant-velocity roller by one pitch each, the first circle having a circle center formed by the center of the sprocket roller and a circle radius formed by a link length of the footstep chain, the second circle having a circle center formed by the center of the constant-velocity roller and a circle radius formed by the link length of the footstep chain, the curved part is shaped so as to be identical with the introductory-roller's center trace.

4. The conveyer apparatus of claim 1, wherein the footstep guide rail is provided, at its other end on a return side from the drive sprocket, with an additional curved part.

5. The conveyer apparatus of claim 1, further comprising:
a driven sprocket whose diameter is substantially equal to the diameter of the drive sprocket;
a chain tensional mechanism that urges the driven sprocket in a direction away from the drive sprocket to apply a predetermined tension on the footstep chain; and
a movable rail which is movable in a direction away from the drive sprocket in association with the driven sprocket, by an urging force of the chain tensional mechanism, wherein
the movable rail is provided, on its one end on the side of the driven sprocket, with a curved part.

6. The conveyer apparatus of claim 1, further comprising:
a movable rail having a circular part whose diameter is substantially equal to the diameter of the drive sprocket, the movable rail being arranged so as to be movable in a direction away from the drive sprocket; and a chain tensional mechanism that urges the movable rail in a direction away from the drive sprocket to apply a predetermined tension on the footstep chain, wherein the movable rail is provided, in the vicinity of the circular part, with a curved part.

7. A conveyer apparatus for minimizing vibration, comprising:
a footstep guide rail having a straight part and an arc part;
a plurality of footsteps having footstep rollers moving along the footstep guide rail;
a footstep chain for connecting the footstep rollers of the plurality of footsteps each other at predetermined pitches; and
a rotating device for generating a driving force to move the footsteps in a designated direction, wherein
the footstep guide rail is arranged, at a changing portion thereof from the straight part to the arc part, so that a horizontal surface by regarding the straight part as horizontal is set at an elevation position obtained by adding a designated offset amount to a tangential line of the arc part along the horizontal surface, and the footstep guide rail is provided, at the changing portion for the arc part, with a curved part.

8. A conveyer apparatus for minimizing vibration, comprising:
a footstep guide rail having a straight part and an arc part;
a plurality of footsteps having footstep rollers moving along the footstep guide rail;
a footstep chain for connecting the footstep rollers of the plurality of footsteps each other at predetermined pitches; and
a rotating device for generating a driving force to move the footsteps in a designated direction, wherein
at a changing portion of the footstep guide rail from the straight part to the arc part, a curvature radius of the arc part is determined by subtracting a designated offset amount from a horizontal surface obtained by regarding the straight part as horizontal, and the footstep guide rail is provided, at the changing portion for the arc part, with a curved part.

9. The conveyer apparatus of claim 7, wherein, in the case where "Vt'" represents a pitch-circle velocity of the footstep rollers connected by the footstep chain and moving the arc part of the footstep guide rail, "Vo'" represents a target average velocity of the footstep rollers at the straight part and "reference position" represents a position where a velocity of one of the footstep rollers becomes "Vo'" as a result of its decelerating from "Vt'", one of a plurality of "reference positions" existing along the footstep guide rail, which is the closest to the arc part, is established as a turning point from the straight part to the curved part.

10. The conveyer apparatus of claim 9, wherein
the designated offset amount is a value that is established so as not to cause the velocity of the footstep roller to fall less than "Vo'" in succession to a deceleration from "Vt'" to "Vo'" at the reference position.

11. The conveyer apparatus of claim 7, wherein, in the case where "arc-part roller" represents one footstep roller being riding on the arc part of the footstep guide rail, "constant-velocity roller" represents another footstep roller which is the second one from the arc-part roller and of which velocity at the straight part is expected to be constant and "introductory-roller's center trace" represents a trace of an intersecting point of first and second circles tracking during moving of the arc-part roller and the constant-velocity roller by one pitch each, the first circle having a circle center formed by the center of the arc-part roller and a circle radius formed by a link length of the footstep chain, the second circle having a circle center formed by the center of the constant-velocity roller and a circle radius formed by the link length of the footstep chain, the curved part is shaped so as to be identical with the introductory-roller's center trace.

12. The conveyer apparatus of claim 8, wherein, in the case where "Vt'" represents a pitch-circle velocity of the footstep rollers connected by the footstep chain and moving the arc part of the footstep guide rail, "Vo'" represents a target average velocity of the footstep rollers at the straight part and "reference position" represents a position where a velocity of one of the footstep rollers becomes "Vo'" as a result of its decelerating from "Vt'", one of a plurality of "reference positions" existing along the footstep guide rail, which is the closest to the arc part, is established as a turning point from the straight part to the curved part.

13. The conveyer apparatus of claim 12, wherein the designated offset amount is a value that is established so as not to cause the velocity of the footstep roller to fall less than "Vo'" in succession to a deceleration from "Vt'" to "Vo'" at the reference position.

* * * * *